United States Patent
Blatchley et al.

(10) Patent No.: US 10,601,087 B2
(45) Date of Patent: *Mar. 24, 2020

(54) TRACTION BATTERY COOLING SYSTEM WITH COOLANT PROPORTIONAL VALVE

(71) Applicant: FORD GLOBAL TECHNOLOGIES, LLC, Dearborn, MI (US)

(72) Inventors: Timothy Noah Blatchley, Dearborn, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,318

(22) Filed: May 21, 2019

(65) Prior Publication Data

US 2019/0273294 A1 Sep. 5, 2019

Related U.S. Application Data

(63) Continuation of application No. 15/142,839, filed on Apr. 29, 2016, now Pat. No. 10,340,563.

(51) Int. Cl.
| | |
|---|---|
| *H01M 10/625* | (2014.01) |
| *H01M 10/613* | (2014.01) |
| *H01M 10/635* | (2014.01) |
| *H01M 10/663* | (2014.01) |
| *H01M 10/6556* | (2014.01) |

(52) U.S. Cl.
CPC ....... *H01M 10/625* (2015.04); *H01M 10/613* (2015.04); *H01M 10/635* (2015.04); *H01M 10/6556* (2015.04); *H01M 10/663* (2015.04); *H01M 2220/20* (2013.01)

(58) Field of Classification Search
CPC .. H01M 10/00; H01M 10/625; H01M 10/613; H01M 10/635; H01M 10/6556; H01M 10/663; H01M 10/20
USPC .......................................... 429/50
See application file for complete search history.

(56) References Cited

U.S. PATENT DOCUMENTS

| | | | |
|---|---|---|---|
| 6,138,466 | A | 10/2000 | Lake et al. |
| 7,918,296 | B2 | 4/2011 | Reddy |
| 7,971,447 | B2 | 7/2011 | Maitre |
| 8,448,460 | B2 | 5/2013 | Dogariu et al. |

(Continued)

FOREIGN PATENT DOCUMENTS

| | | |
|---|---|---|
| JP | 2012114030 A | 6/2012 |
| WO | 2012016885 A1 | 2/2012 |

OTHER PUBLICATIONS

English Machine Translation of JP2012114030A dated Jun. 14, 2012.

(Continued)

*Primary Examiner* — Abdullah A Riyami
*Assistant Examiner* — Nader J Alhawamdeh
(74) *Attorney, Agent, or Firm* — David Kelley; King & Schickli, PLLC

(57) ABSTRACT

A cooling system is provided for a traction battery of an electrified motor vehicle. That cooling system includes a cooling circuit, a refrigerant circuit, a plurality of flow control valves and a control system. That control system includes a controller configured to (a) control operation of the plurality of flow control valves, including a coolant proportional valve, and (b) prioritize cabin cooling over traction battery cooling.

7 Claims, 6 Drawing Sheets

(56) References Cited

U.S. PATENT DOCUMENTS

| | | |
|---|---|---|
| 8,620,506 B2 | 12/2013 | Kummer |
| 8,741,465 B2 | 6/2014 | Nagata et al. |
| 8,753,762 B2 | 6/2014 | Major et al. |
| 2009/0249807 A1 | 10/2009 | Nemesh et al. |
| 2012/0085114 A1* | 4/2012 | Graaf ................ B60H 1/00278 62/238.7 |
| 2012/0297809 A1* | 11/2012 | Carpenter ............... B60L 1/003 62/244 |
| 2013/0022888 A1* | 1/2013 | Vollmer ............ H01M 8/04007 429/434 |
| 2013/0280564 A1* | 10/2013 | Zheng ................. H01M 2/1077 429/62 |
| 2014/0020415 A1* | 1/2014 | Heyl ....................... F25B 13/00 62/119 |
| 2014/0070013 A1 | 3/2014 | Stanek et al. |
| 2015/0013367 A1* | 1/2015 | Carpenter .......... B60H 1/00278 62/222 |
| 2015/0202986 A1* | 7/2015 | Hatakeyama ............ B60H 1/22 165/287 |
| 2017/0313158 A1* | 11/2017 | Porras ............... H01M 10/6568 |
| 2017/0317393 A1* | 11/2017 | Blatchley ............ H01M 10/625 |

OTHER PUBLICATIONS

English Machine Translatin of WO2012016885A1 dated Feb. 9, 2012.
"Sustainability and Environment Protection E-Car"; Sanhua Europe; https://www.sanhuaeurope.com/en/about-us/sustainability-and-enviromental-policies; printed Nov. 13, 2015; pp. 1-6.

\* cited by examiner

FIG. 4

Load = Funct(AirTemp, BlowerSpeed)

| Blower Speed (%) | Ambient Air Temperature (DegC) | | | | | | | |
|---|---|---|---|---|---|---|---|---|
| | 10 | 15 | 20 | 25 | 30 | 35 | 40 | 45 |
| 0 | 0 | 0 | 10 | 20 | 25 | 30 | 40 | 45 |
| 10 | 0 | 10 | 10 | 20 | 25 | 30 | 40 | 45 |
| 20 | 10 | 10 | 15 | 20 | 30 | 35 | 40 | 50 |
| 30 | 15 | 20 | 25 | 30 | 35 | 40 | 50 | 55 |
| 40 | 25 | 20 | 30 | 40 | 50 | 55 | 60 | 65 |
| 50 | 20 | 30 | 40 | 45 | 50 | 55 | 60 | 65 |
| 60 | 30 | 40 | 50 | 50 | 60 | 65 | 70 | 75 |
| 70 | 30 | 40 | 50 | 60 | 65 | 75 | 80 | 80 |
| 80 | 35 | 50 | 60 | 60 | 70 | 80 | 90 | 90 |
| 90 | 40 | 50 | 60 | 70 | 80 | 90 | 95 | 100 |
| 100 | 45 | 50 | 60 | 70 | 80 | 90 | 100 | 100 |

TRACTION BATTERY COOLING SYSTEM WITH COOLANT PROPORTIONAL VALVE

This application is a continuation of U.S. patent application Ser. No. 15/142,839(now U.S. Pat. No. 10,340,563), filed Apr. 29, 2016, the full disclosure of which is incorporated herein by reference.

TECHNICAL FIELD

This document relates generally to the motor vehicle equipment field and, more particularly, to a traction battery cooling system for an electrified motor vehicle. That cooling system incorporates a coolant proportional valve and a refrigerant-to-coolant heat exchange chiller.

BACKGROUND

Hybrid electric vehicles and electric vehicles use an electric motor to propel the vehicle. The power is supplied to that electric motor by a traction battery. The traction battery is configured to store an electrical charge and may also be used to power other vehicle components. Efficient use of the battery may significantly extend the range of the motor vehicle. Since the battery power availability is affected by battery temperature, hybrid and electric vehicles generally include a liquid cooling system for the traction battery. Many such systems incorporate a refrigerant-to-coolant chiller that is coupled to the vehicle cabin's cooling/heating, ventilation and air conditioning (HVAC) system. As a result, utilization of the chiller to provide traction battery cooling may lead to temperature swings of the conditioned air being discharged into the motor vehicle cabin. Such swings in temperature may be noticeable by the vehicle occupants and, therefore, are not desired.

This document relates to a new and improved traction battery cooling system for an electrified motor vehicle that limits or substantially eliminates these temperature swings under normal operating conditions thereby increasing vehicle occupant comfort and satisfaction.

SUMMARY

In accordance with the purposes and benefits described herein, a traction battery cooling system is provided for an electrified motor vehicle. That cooling system comprises a coolant circuit, a refrigerant circuit, a plurality of flow control valves and a control system.

The coolant circuit circulates coolant between the traction battery and either a battery radiator or a chiller. The coolant circuit also includes a chiller bypass. The refrigerant circuit circulates refrigerant between a compressor, a condenser and either a first evaporator or the chiller. The plurality of flow control valves are provided in both the coolant circuit and the refrigerant circuit. The plurality of flow control valves includes a coolant proportional valve in the coolant circuit between the traction battery and the chiller for controlling the flow of coolant through the chiller.

The control system includes a controller that is configured to (a) control operation of the plurality of flow control valves and (b) prioritize cabin cooling over traction battery cooling when the traction battery is at a normal or acceptable operating temperature. Advantageously, the cooling system functions to delay using the chiller for battery cooling until the HVAC load for the motor vehicle cabin is stabilized and is below total AC capacity thereby reducing or substantially eliminating undesired swings in the conditioned air being discharged by the HVAC system into the motor vehicle cabin.

In some possible embodiments, the controller is configured to include a first data input for ambient air temperature. Further, the controller is configured to include a second data input for HVAC blower speed. In addition, the controller is configured to include a third data input for evaporator temperature. In addition, the control system may further include an ambient temperature sensor and an evaporator temperature sensor that are connected, respectively, to the first and third data inputs.

In some possible embodiments the plurality of flow control valves includes a battery coolant valve in the coolant circuit downstream of the traction battery and upstream of the battery radiator and the coolant proportional valve. This valve controls the flow of coolant from the traction battery to either the battery radiator or the coolant proportional valve.

In some embodiments, the plurality of flow control valves includes a thermal expansion device in the refrigerant circuit between the condenser and the chiller for controlling flow of refrigerant into the chiller from the condenser.

In some possible embodiments, the controller includes a fourth data input for traction battery temperature. In some embodiments, the controller includes a fifth data input for coolant temperature. In such embodiments, the control system may further include a traction battery temperature sensor and a coolant temperature sensor.

In accordance with yet another aspect, a method is provided for controlling traction battery cooling while limiting temperature swings of conditioned air into a cabin of an electrified motor vehicle. That method includes the steps of (a) prioritizing, by a controller, cabin cooling over traction battery cooling based upon HVAC load and evaporator error and (b) controlling flow of battery coolant to a chiller by means of a coolant proportional valve under control of the controller.

Still further, that method may also comprise the steps of: (a) monitoring, by a first device, ambient air temperature, (b) monitoring, by a second device, HVAC blower speed, and (c) monitoring, by a third device, evaporator temperature.

The method may further include the step of determining, by the controller, HVAC load based upon indicated HVAC blower speed and indicated ambient air temperature. In addition, the method may include the steps of determining, by the controller, evaporator error by comparing indicated evaporator temperature to a target evaporator temperature and determining, by the controller, chiller AC capacity as a function of evaporator error and HVAC load.

Still further, the method may include the step of monitoring, by a fourth device, traction battery coolant temperature. Still further, the method may include the step of calculating, by the controller, traction battery target coolant temperature based upon traction battery temperature.

In addition, the method may also include other steps such as controlling, by the controller, the flow of coolant to the chiller based upon indicated traction battery temperature versus traction battery target temperature.

Still further, the method may include the step of determining, by the controller, a maximum coolant proportional valve opening position as a function of A/C chiller capacity. The valve opening position determines the coolant flow amount to the chiller. The method may also include the steps of determining, by the controller, a coolant proportional valve opening target position as an output of a battery coolant temperature Proportional and Integral (PI) controller and determining, by the controller, a final coolant proportional valve opening position as a function of the maximum coolant proportional valve opening position and the coolant proportional valve opening target position.

The method may also include the steps of fully opening, by the controller, the coolant proportional valve to the chiller and controlling, by the controller, compressor speed based upon battery coolant temperature error when operating in battery cooling only mode.

In the following description, there are shown and described several preferred embodiments of the cooling system and method of controlling traction battery cooling while limiting temperature swings of the conditioned air being discharged into the cabin of an electrified motor vehicle. As it should be realized, the cooling system and method are capable of other, different embodiments and their several details are capable of modification in various, obvious aspects all without departing from the cooling system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cooling system and related method and together with the description serve to explain certain principles thereof. In the drawing figures:

FIG. 4 is a table indicating HVAC load for one possible embodiment of the cooling system.

Reference will now be made in detail to the present preferred embodiments of the traction battery cooling system, examples of which are illustrated in the accompanying drawing figures.

DETAILED DESCRIPTION

Figure 1:
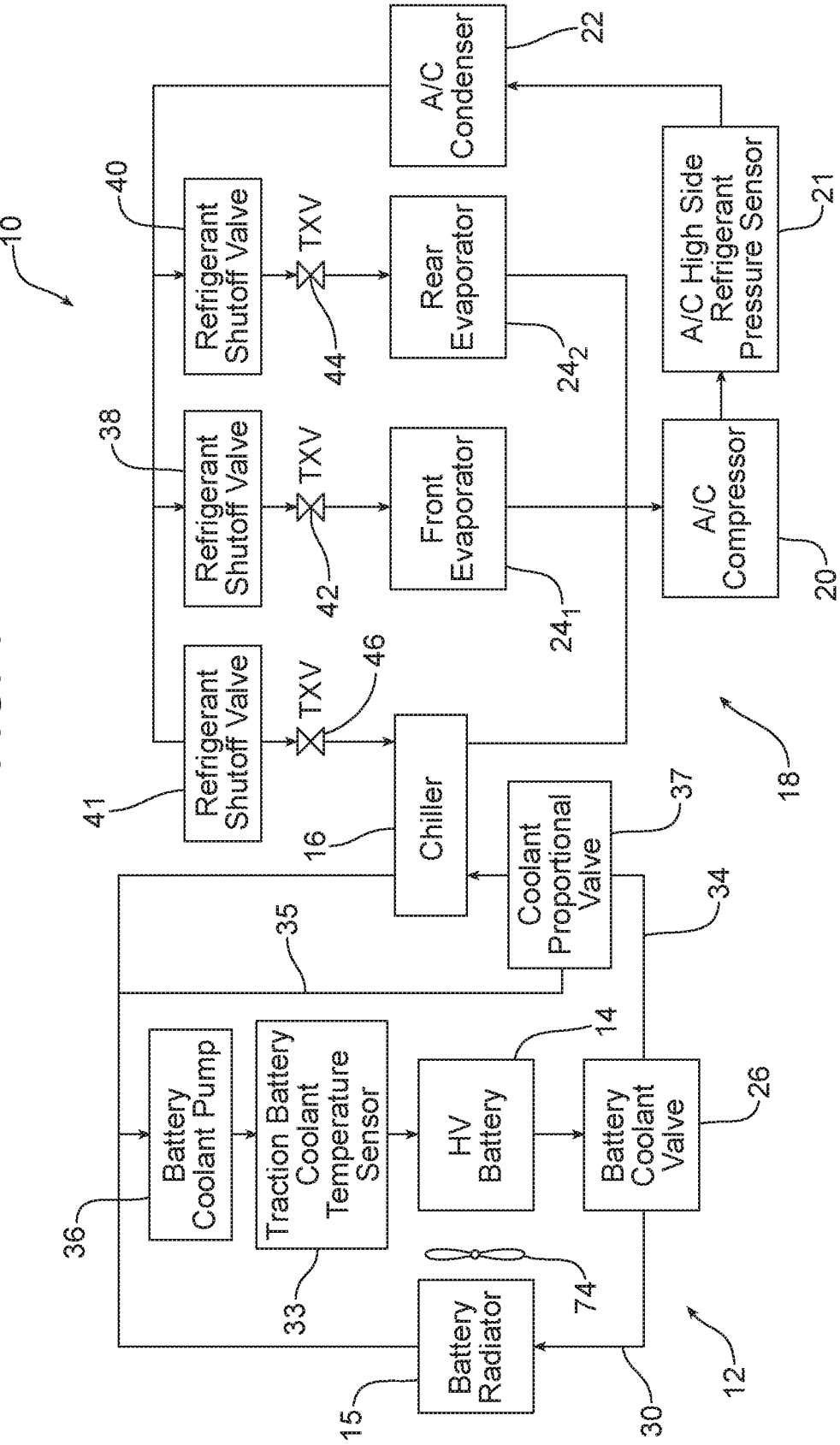
FIG. 1 is a schematic block diagram of the traction battery cooling system.

Reference is now made to FIG. 1 schematically illustrating the traction battery cooling system 10 adapted for an electrified motor vehicle such as a hybrid electric vehicle or an electric vehicle. The cooling system 10 includes a coolant circuit 12 for circulating a coolant between a traction battery 14 and either a battery radiator 15 and/or a refrigerant-to-coolant chiller 16 for heat exchange (there is no mixing of refrigerant and coolant). The coolant may be a conventional coolant mixture, such as water and ethylene glycol.

The traction battery cooling system 10 also includes a refrigerant circuit generally designated by reference numeral 18. The refrigerant circuit 18 circulates a refrigerant between an A/C compressor 20, an A/C condenser 22 and either or both of the two evaporators $24_1$ or $24_2$ and/or the chiller 16. The refrigerant may be a conventional refrigerant, such as R134a or R1234yf.

As further illustrated in FIG. 1, the cooling system 10 also includes a plurality of flow control valves in the coolant circuit 12 and the refrigerant circuit 18. More specifically, the traction battery coolant valve 26 is provided in the coolant circuit 12 downstream from the traction battery 14 where it is adjusted to direct coolant flow through either a first loop 30 between the traction battery 14 and the traction battery radiator 15 or a second loop 34 between the traction battery and the chiller 16. A traction battery coolant pump 36 functions to circulate the coolant through either or both loops depending upon the position of the traction battery coolant valve 26. A sensor 33 monitors the temperature of that coolant upstream from the traction battery 14.

As still further illustrated in FIG. 1, the second loop 34 includes a chiller bypass 35. Further, the plurality of flow control valves includes a coolant proportional valve 37 to direct coolant through the chiller 16 or around the chiller through the bypass 35 or both.

Referring to loop 18, the plurality of flow control valves also includes a front evaporator shutoff valve 38 between the condenser 22 and the front evaporator $24_1$, a rear evaporator shutoff valve 40 between the condenser and the rear evaporator $24_2$ and a refrigerant shutoff valve 41 between the condenser and the chiller 16. In addition, a first thermal expansion device 42 is provided in the refrigerant circuit 18 between the front evaporator shutoff valve 38 and the front evaporator $24_1$. Similarly, a second thermal expansion device 44 is provided in the refrigerant circuit 18 between the rear evaporator shutoff valve 40 and the rear evaporator $24_2$. Further, a third thermal expansion device 46 is provided in the refrigerant circuit 18 between the refrigerant shutoff valve 41 and the chiller 16. Here, it should be appreciated that the evaporator shutoff valve 38 and the first thermal expansion device 42 could be combined into one device, if desired, to minimize possible refrigerant leak paths. The shutoff valve 40 and second thermal expansion device 44 could be similarly combined as could the refrigerant shutoff valve 41 and the third thermal expansion device 46.

Figure 2:
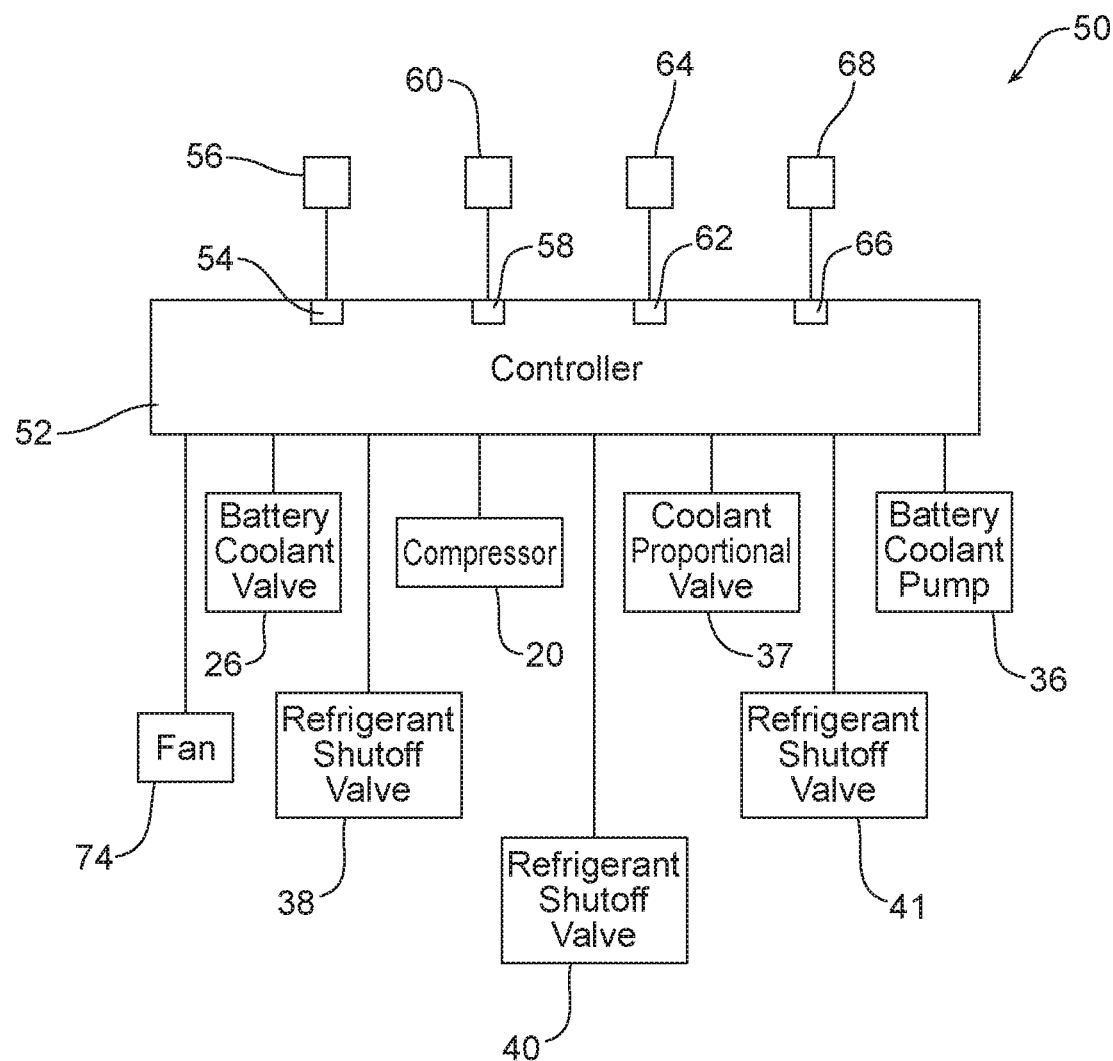
FIG. 2 is a schematic block diagram of the control system for the cooling system illustrated in FIG. 1.

As illustrated in FIG. 2, the cooling system 10 also includes a control system generally designated by reference numeral 50. As shown, the control system 50 includes a controller 52. The controller 52 is a computing device such as a dedicated microprocessor or electronic control unit (ECU) operating in accordance with appropriate instructions provided by control software. Such a controller 52 may comprise one or more processors, one or more memories and one or more network interfaces that all communicate with each other over a communication bus.

The controller 52 is configured to (a) control operation of the plurality of flow control valves including, but not necessarily limited to the traction battery cooling valve 26, the coolant proportional valve 37 and the refrigerant shutoff valves 38, 40, and 41, and (b) prioritize cabin cooling over traction battery cooling when the traction battery is at a normal or acceptable operating temperature. Toward this end, the controller 52 is configured to include a first data input 54 that is connected to a sensor or other device 56, such as another controller, providing data respecting the ambient air temperature. The controller 52 is also configured to include a second data input 58 connected to a sensor or other device 60, such as another controller, for providing data input for HVAC blower speed.

As further shown, the controller 52 is also configured to include a third data input 62 that is connected to a sensor or device 64, such as another controller, providing data respecting temperature of the evaporators 24$_1$, 24$_2$ (one sensor or device 64 per evaporator). The controller 52 is also configured to include a fourth data input 66 that is connected to a sensor or device 68, such as another controller, providing data respecting the traction battery coolant temperature. While not illustrated in FIG. 2, it should be appreciated that the controller 52 may include additional data inputs connected to other sensors or devices, including other controllers, that provide data input respecting other system operating parameters including, but not necessarily limited to, refrigerant pressure (note sensor 21 in FIG. 1), traction battery temperature and cabin cooling requests from the HVAC system of the motor vehicle.

Controller 52 is generally configured to provide the necessary cooling for the traction battery 14 while utilizing a minimum amount of motor vehicle energy. Toward this end, the controller 52 is configured to operate in three different battery cooling modes. In the first mode, which consumes the least amount of motor vehicle energy, the traction battery coolant valve 26 is positioned to circulate the coolant in the coolant circuit 12 through the first loop 30 between the traction battery 14 and the battery radiator 15. Ambient air forced through the radiator 15 during motor vehicle movement functions to cool the coolant which is then circulated by the pump 36 back through the battery 14 in order to maintain a desired operating temperature for the traction battery. In the event the temperature of the traction battery 14 rises to a certain predetermined temperature, the controller 52 operates in a second cooling mode wherein the fan 74 is activated to force cooling air through the radiator 15 thereby providing additional cooling to the coolant and the traction battery 14 through which the coolant is circulated.

In the event the temperature of the traction battery 14 reaches a predetermined, higher temperature when operating in the second cooling mode, the controller 52 initiates a third cooling mode by repositioning the traction battery coolant valve 26 to direct some or all of the coolant through the second loop 34 so that the selected portion of the coolant flow, as determined by the position of the coolant proportional valve 37, is pushed by the pump 36 to circulate between the battery 14 and the chiller 16. It is in this mode that the controller 52 is configured to prioritize cabin cooling over traction battery cooling during normal motor vehicle operation if the cabin is also being cooled.

Toward this end, a method of controlling traction battery cooling while limiting temperature swings of the conditioned air being discharged into the cabin of an electrified motor vehicle is provided. That method includes the steps of (a) prioritizing, by the controller 52, cabin cooling over traction battery cooling based upon HVAC load and evaporator error and (b) controlling flow of battery coolant to the chiller 16 by means of the coolant proportional valve 37. In addition, the method may further include the steps of: (a) monitoring, by a first device 56, ambient air temperature, (b) monitoring, by a second device 60, HVAC blower speed, and (c) monitoring, by a third device 64, evaporator temperature. The controller 52 then determines HVAC load based upon indicated HVAC blower speed and indicated ambient temperature.

Figure 3:
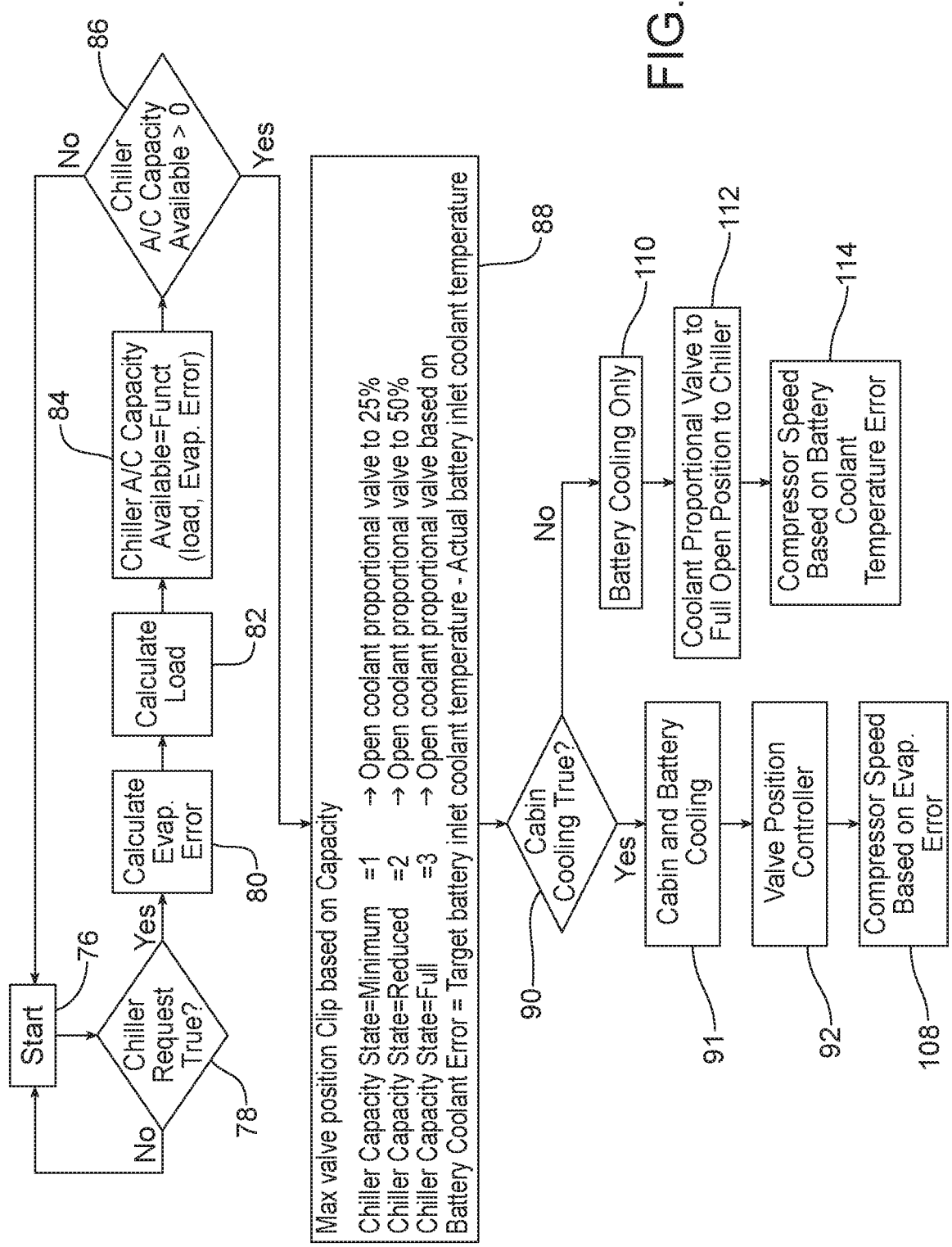
FIG. 3 is a control logic flow diagram depicting operation of one possible embodiment of the cooling system.

More specifically, as illustrated in FIG. 3, the algorithm determines if battery chiller capacity is available when the chiller 16 is requested and thus determines how to control the coolant proportional valve 37. If the chiller 16 is not available, it is assumed that the battery cooling will continue via the radiator 15. The method starts at Box 76. The first step is to determine if there is a chiller request (Box 78). If the chiller 16 is not requested the algorithm goes back to the start. If the chiller request is present, the controller 52 moves to Box 80 and determines/calculates evaporator error (Box 80) and HVAC load (Box 82). As illustrated in FIG. 4, HVAC load is a function of ambient air temperature and HVAC blower speed and, therefore, is determined by the controller 52 based upon data provided by the sensors or devices 56, 60 at the respective data inputs 54, 58. In the embodiment of the system 10 illustrated in FIG. 4, an ambient temperature of 25 degrees C. and a blower speed percentage of 60% produces an HVAC load of 50.

Evaporator error is determined by comparing the actual evaporator temperature as indicated by the sensor or device 64 at the third data input 62 to a target evaporator temperature as stored in the controller 52.

Figure 5:
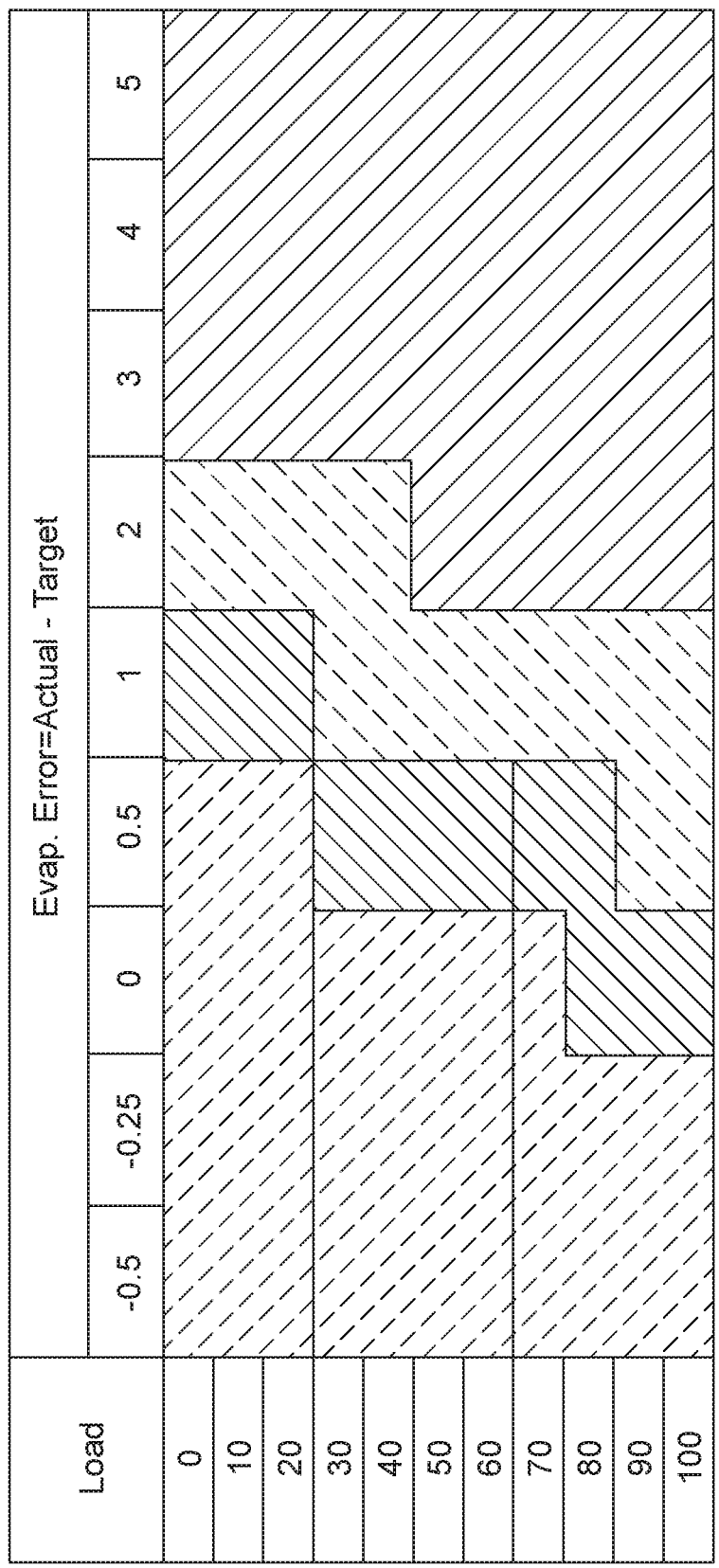
FIG. 5 is a table illustrating four different levels or states of chiller operation management for one possible embodiment of the cooling system based upon load and evaporator error.

As illustrated in FIG. 3 the controller 52 then determines the chiller A/C capacity available for traction battery cooling (note Box 84) as a function of the determined evaporator error and HVAC load. FIG. 5 illustrates a function table for one particular embodiment of the cooling system 10. In this embodiment, an evaporator error of 3, 4 or 5 indicates that the chiller 16 is not available for any level of traction battery cooling (Chiller Capacity State #0). In contrast, an evaporator error of 2 and a load of 30 indicates that the chiller 16 is available at a minimum opening for battery cooling (Chiller Capacity State #1). Still further, an evaporator error of 0.5 and a load of 60 indicates that the chiller is available for reduced chiller cooling of the traction battery 14 (Chiller Capacity State #2). Finally, for example, an evaporator error of 0 and a load of 50 indicates that a full level of the chiller 16 is available for traction battery cooling (Chiller Capacity State #3).

As illustrated in FIG. 3, if chiller A/C capacity is not available for cooling (Box 86), the operating algorithm returns to start. In this situation, the battery thermal system will continue to cool via the battery radiator 15 (with or without operation of the fan 74) and continue to request the chiller 16. Once chiller capacity becomes available, the battery thermal system will transition to the chiller 16. In other words, there are times when the battery cooling mode may be requesting the chiller 16 but still running in the battery radiator loop 30.

In contrast, if evaporator chilling is available for the traction battery 14, the controller 52 translates the chiller AC capacity available to the appropriate maximum position of the coolant proportional valve 37 at Box 88. In the embodiment illustrated in FIG. 3, when chiller capacity is indicated to be at a minimum, the controller 52 may open the coolant proportional valve 37 in the coolant circuit 12 to a maximum of 25% opening (Chiller Capacity State #1) to allow the flow of the coolant through the chiller 16 for heat exchange with the refrigerant in the refrigerant circuit 18 and cooling of the traction battery 14. In contrast, when the chiller 16 is available at the reduced level as determined in FIG. 5, the controller 52 calculates a maximum opening signal for the coolant proportional valve 37 50% (Chiller Capacity State #2) thereby allowing a maximum increase in the flow of coolant to the chiller 16 for heat exchange with the refrigerant and cooling of the traction battery 14.

When cabin and battery cooling are both required (Box 90 and Box 91), the closed loop valve position controller algorithm (Box 92) is initiated. The algorithm to determine valve position is a closed loop control algorithm that will open the coolant proportional valve 37 based on battery coolant temperature. The previous step shown calculates a maximum valve opening based on chiller AC capacity. The valve will open in proportion to chiller capacity availability. Further, it should also be appreciated that the opening percentages indicated are presented purely for purposes of example and that the coolant proportional valve 37 may provide for a full range of opening from 0% up to 100%.

Figure 3A:
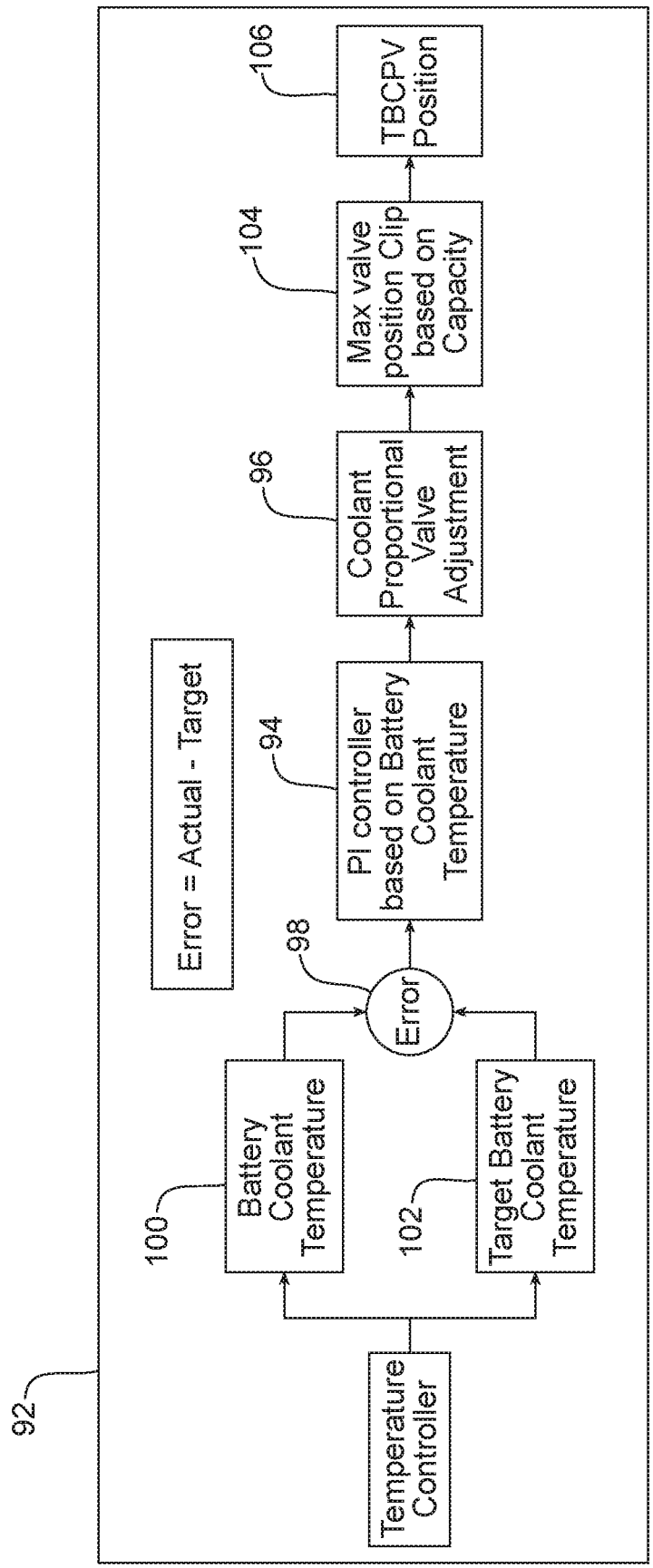
FIG. 3a is a detailed view of Box 92 of the control logic flow diagram depicted in FIG. 3.

Once the controller 52 determines the chiller capacity available (Chiller Capacity State #3), the coolant proportional valve 37 position is determined by Box 92 (see FIGS. 3 and 3a). Thus, the controller 52 implements a battery coolant temperature PI controller (Box 94) to control the coolant temperature into the traction battery 14. The coolant proportional valve 37 makes positional adjustments (Box 96) based upon the controller calculated battery coolant temperature error (Box 98) determined by comparing the actual or indicated battery coolant temperature (Box 100) to the target battery coolant temperature (Box 102) stored in the controller.

This PI control is always running in the controller 52, but chiller capacity states #1 and #2 apply the coolant proportional valve 37 position max clip based on chiller A/C capacity (Box 104) which limits the coolant proportional valve 37 opening position (Box 106). The controller 52 also controls the speed of the A/C compressor 20 based upon evaporator error (Box 108). See FIG. 3.

In contrast, if the HVAC system is not in use for cabin cooling as determined at Box 90, the system 10 is operating in Battery Only Mode (Box 110). See FIG. 3. In this mode, the controller 52 fully opens the coolant proportional valve 37 to the chiller 16 (Box 112) and controls the speed of the A/C compressor 20 based upon battery coolant temperature error (Box 114).

Advantageously, the controller 52 has the ability to manage the flow of coolant to the chiller 16 at all times. This allows for traction battery cooling via the chiller 16 to be started smoothly and run continuously without impact to the cabin. As a result, detrimental swings in the temperature of the conditioned air passing through the evaporators $24_1$, $24_2$ and later being discharged into the cabin are minimized. The system 10 and related method prioritize cabin cooling by delaying the chiller start and also provide a method to run at reduced chilling capacity to maintain cabin comfort under changing A/C capacity conditions. Only under extreme operating conditions where traction battery temperatures rise to predetermined critical levels does the controller 52 prioritize battery cooling over cabin cooling by first providing full AC capacity to the chiller 16 for traction battery cooling and any remaining AC capacity to the cabin.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cooling system for an electrified motor vehicle, comprising:
    a coolant circuit circulating coolant between a traction battery and either a battery radiator or a chiller;
    a refrigerant circuit circulating refrigerant between a compressor, a condenser and either a first evaporator or said chiller;
    a plurality of flow control valves in said coolant circuit and said refrigerant circuit; and
    a control system including a controller configured to (a) control operation of said plurality of flow control valves and (b) prioritize cabin cooling over traction battery cooling when the traction battery is at a normal operating temperature; wherein said controller is configured to include a first data input for ambient air temperature, a second data input for HVAC blower speed and a third data input for evaporator temperature.

2. The cooling system of claim 1, wherein said control system further includes an ambient temperature sensor and an evaporator temperature sensor.

3. The cooling system of claim 2, wherein said plurality of flow control valves includes a battery coolant valve in said coolant circuit downstream of said traction battery and upstream of said battery radiator.

4. The cooling system of claim 3, wherein said plurality of flow control valves includes a thermal expansion device in said refrigerant circuit between said condenser and said chiller controlling flow of said refrigerant into said chiller from said condenser.

5. The cooling system of claim 4, wherein said controller is configured to include a fourth data input for traction battery temperature.

6. The cooling system of claim 5, wherein said controller is configured to include a fifth data input for coolant temperature.

7. The cooling system of claim 6, wherein said control system further includes a traction battery temperature sensor and a coolant temperature sensor.

* * * * *